United States Patent [19]

Ruprecht

[11] Patent Number: 5,166,826
[45] Date of Patent: Nov. 24, 1992

[54] BAND-PASS FILTER FOR ELECTROMAGNETIC RADIATION

[75] Inventor: Robert Ruprecht, Walzbachtal, Fed. Rep. of Germany

[73] Assignee: Kernforschungszentrum Karlsruhe GmbH, Karlsruhe, Fed. Rep. of Germany

[21] Appl. No.: 782,603

[22] Filed: Oct. 25, 1991

[30] Foreign Application Priority Data

Oct. 29, 1990 [DE] Fed. Rep. of Germany ....... 4034364

[51] Int. Cl.⁵ .......... G02B 5/18; G02B 27/44
[52] U.S. Cl. .................................... 359/566; 359/569
[58] Field of Search .............. 359/566, 567, 569, 574

[56] References Cited

U.S. PATENT DOCUMENTS

| | | | |
|---|---|---|---|
| 2,189,751 | 2/1940 | Bocca et al. | 359/574 |
| 4,083,627 | 4/1978 | Okano | 359/574 |
| 4,421,398 | 12/1983 | Suzuki et al. | 359/574 |

Primary Examiner—Bruce Y. Arnold
Assistant Examiner—Martin Lerner

[57] ABSTRACT

In a band-pass filter for electromagnetic radiation comprising a membrane having periodically arranged slot structure elements formed therein each consisting of at least three slots of equal length extending from a common point in radial symmetry, the membrane with the slot elements has a thickness of 33 to 500 μm and the ratio of the membrane thickness to the grating constant which defines the periodic arrangement of the slot structure elements is larger than 1, thereby achieving optimum blocking characteristics for the filter.

3 Claims, 1 Drawing Sheet

BAND-PASS FILTER FOR ELECTROMAGNETIC RADIATION

BACKGROUND OF THE INVENTION

The invention relates to a band-pass filter for electromagnetic radiation which consists of a membrane with slot structures arranged to provide for optimum filter selectivity.

In photometric tests or analysis in the infrared range, wide-band semiconductor detectors are utilized. In order to achieve the best possible spectral analysis and, consequently, determinations with regard to the objects to be analyzed, the large sensitivity ranges of the detectors must be divided into ranges with defined band width by means of band-pass filters.

In order to provide for optimal measuring range separation the band-pass filters should have a rectangularly shaped transmission profile. As a result of such a rectangular profile a sharply defined passing band would be obtained. With the flank between the suppressed spectral range and the passing band being infinitely large a band-pass filter would provide for ideal definitions. In addition to full definition (sharpness) an ideal band-pass filter provides for complete radiation passage in the pass-band and total absorption in the adjacent spectral ranges.

In practice, however, the definition of band-pass filters varies since the inclination of the flanks at the pass-band depends on the geometric dimensions of the filter. High definition, that is, a large inclination of the low-frequency flank, is particularly then necessary when the low-frequency end of the desired measurement range does not coincide with the sensitivity limit of the detectors.

In the publication "Interference filters for far infrared", Appl. Opt. 7 (1968), pages 1987 to 1996, R. Ulrich describes band-pass filters which consist of metal membranes with periodically arranged slot apertures. These band-pass filters are known as so-called resonance gratings.

In a publication "Kleinheubacher Berichte" No. 29 (1986) published by Fernmeldetechnisches Zentralamt, Postfach 5000, 6100 Darmstadt, Germany, pages 501 to 505, H. P. Gemünd describes a process for manufacturing microstructures on a galvanic base layer disposed on a glass plate. The grating constant in this arrangement is above 34 $\mu$m and the filter thickness is smaller than the grating constant. These band-pass filters have only relatively small thickness and, as a result, inadequate filtering characteristics.

From an article by S. T. Peng et al. "Theory of Periodic Dielectric Waveguides" published in IEEE Transactions on Microwave Theory and Techniques, Vol. MTT-23, No. 1, January, 1975, pages 123 to 133, dielectric wave guides are known, which have periodically arranged slot structures. However the structures described therein are not suitable for band-pass filters.

It is the object of the present invention to provide a membrane-type band-pass filter with improved filter characteristics.

SUMMARY OF THE INVENTION

In a band-pass filter for electromagnetic radiation, which comprises a membrane having periodically arranged slot structure elements formed therein, each consisting of at least three slots of equal length extending from a common point in radial symmetry, the membrane with the slot elements has a thickness of 33 to 500 $\mu$m and the ratio of the membrane thickness to the grating constant which defines the periodic arrangement of the slot structure elements is larger than 1.

With such a filter thickness and slot structure arrangement the band-pass filter achieves optimal blocking characteristics permitting excellent measuring range separation, that is, optimal filter selectivity, which provides for improved spectral analysis of apparatus equipped with such a band-pass filter.

Preferably, the grating constant is smaller than 34 $\mu$m. With a slot structure composed of tripolar slot structure elements with legs of a length of $l$, the low-frequency maximum location of the radiation transmission curve can be easily predetermined at a wave length $\lambda = 2 \, l \times \cos 30°$.

DESCRIPTION OF THE PREFERRED EMBODIMENTS

Figure 1:
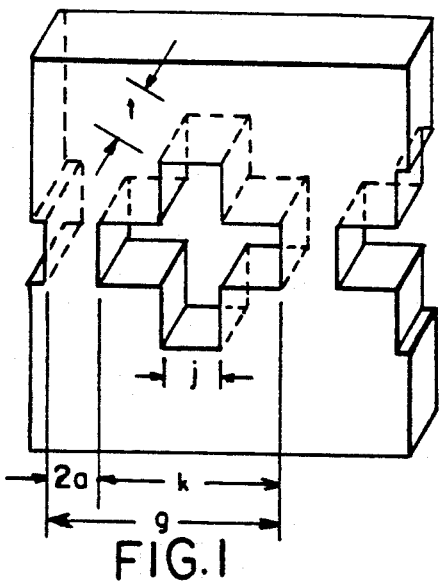
FIGS. 1 and 2 show in perspective different arrangements for the slot apertures of the filter.
Figure 2:
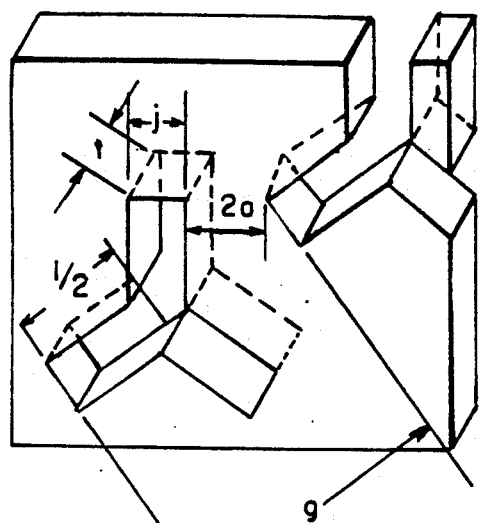

In the slot aperture representations of FIGS. 1 and 2 the paper plane represents the surface of the filter membrane which has a thickness t. FIG. 1 shows a section of a cross-type slot arrangement having a slot length k; FIG. 2 shows a tripolar slot aperture with a leg length $l$, both having a slot width j. The distance 2$a$ between the slot apertures is given by the slot geometry and the grating constant g.

Figure 4:
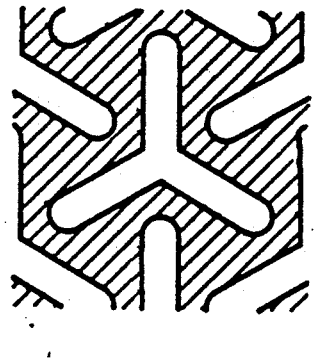
FIG. 4 is a planar view of a tripolar slot aperture structure.
Figure 3:
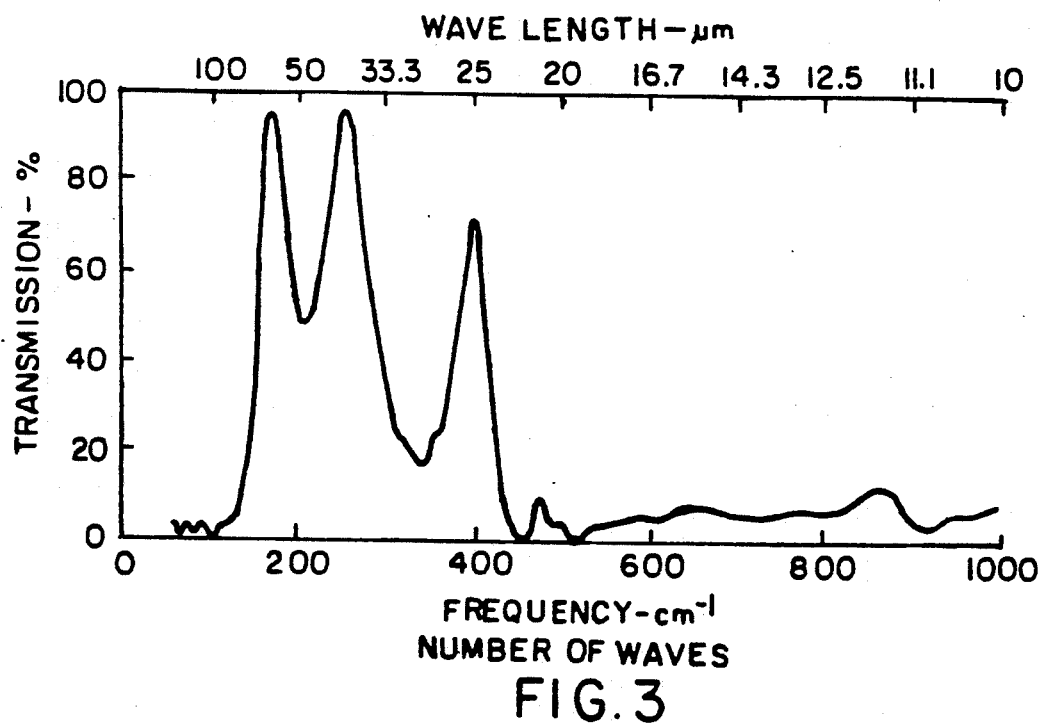
FIG. 3 shows the transmission curve of a by-pass filter with tripolar slot apertures of the type shown in FIG. 3.

FIG. 3 shows the transmission curve of a 22 $\mu$m thickness band-pass filter with tripolar slot apertures according to FIGS. 2 or 4. The transmission rate is given in % relative to an iris diaphragm over a wave number per cm length [cm$^{-1}$] or the wave length [$\mu$m]. The transmission curve shows four maxima within the passing band between the low-frequency blocking range and the high frequency diffraction range.

With appropriate filter thickness t the band-pass filter according to FIGS. 1 and 2 have good blocking characteristics and a large inclination of the low-frequency flank and provide for passing bands of different widths depending on the slot aperture shape. The passing bands of band-pass filters with tripolar slot apertures are wider than those of filters with cross-slot apertures, independently of the filter thickness. With increasing filter thickness, the blocking capabilities and the inclination of the low-frequency flank increase. Also with increasing filter thickness, in addition to the low-frequency transmission maxima, based on wave length which corresponds to the grating constant, additional maxima occur whose maxima approach the first low-frequency maximum.

The location of the low-frequency maximum is essentially independent of the filter thickness. The location of additional maxima is determined by the filter thickness.

For a filter thickness smaller than one-half the grating constant, a good coincidence of the location of the transmission maxima determined in a computer simulation described in the literature and the measurements obtained from experiments with band-pass filters of a thickness larger than 0.1 times the grating constant was found.

The band-pass filters were made with a grating constant of 1.5 to 35 μm. A number of processes therefor were available; they include lithographic methods, microgalvanic forming or resin molding and microgalvanic forming. The filters are made either self-supporting or supported only at their edges on a support frame so that no massive substrate which would act as a dielectric affects the transmission properties of the band-pass filter.

The band-pass filter is made either on top of a multi-layer or a composition substrate.

If a multi-layer substrate is used, a polymeric negative structure of a filter is generated on the substrate by a lithographic procedure such that the negative structure has a thickness exceeding the thickness of the subsequently galvanically deposited filter structure. With this procedure adjacent the walls of a polymeric structure the filter structure is produced by microgalvanic forming and the resist structure is not overgrown. After removal of the polymeric structure a support frame is cemented onto the filter structure. Preferably a cement with a filler is used which provides for good heat transfer from the filter to the support frame. Subsequently the filter, with the support frame thereon, is mechanically removed from the substrate.

The filter is mechanically removed by separation of two layers or within one layer of the multi-layer substrate. If an auxiliary layer is removed from the substrate together with the filter, it will subsequently be removed selectively with regard to the filter metal. This process provides for a band-pass filter extending across a support frame without further supports.

Filters with a thickness exceeding 4 μm may be removed from the substrate without being supported on a support frame by removing the uppermost layer of the multi-layer substrate together with the filter. Subsequently they may be mounted on a support frame by diffusion welding. Band-pass filters of a thickness greater than 30 μm are sufficiently stable without a support frame so that they can be employed as self-supporting filters.

The composite substrate consists of a core of, for example, titanium which can be selectively dissolved with regard to filter material. Around the core first an annulus of the same metal of which the filter is to be made, such as copper, is galvanically deposited to form a composite substrate. On this composite substrate a lithographic procedure and finally the microgalvanic forming steps are performed. Concurrently with the forming of the filter on the titanium core, metal deposition also occurs on the annulus around the core so that the filter membrane is integral with the annulus which later becomes the support frame. After removal of the polymeric structure, the core is selectively dissolved so that a filter structure with support frame, but no other support means, is obtained.

For a band-pass filter with tripolar slot apertures with a leg length of $l=11.5$ μm the position of the first low-frequency transmission maximum was calculated to be at 39.8 μm utilizing the formula $\lambda = 2\ l \times \cos 30°$.

This value coincides with the measured values within a variance of ±2%. Such deviations are easily caused by manufacturing tolerances.

As an example, for a band-pass filter with cross-slot apertures according to FIG. 1, a filter with a filter thickness of $t=31$ μm was made. The cross-slot apertures have a slot length $k=18.5$ μm and a slot width $j=3$ μm. The grating constant is 20 μm such that the distance $2a$ of the slot apertures is 1.5 μm.

Band-pass filters with tripolar slot apertures in accordance with FIG. 2 were made with a filter thickness of $t=34$ μm. The tripolar leg lengths $l=11.5$ μm and the slot width $j=3$ μm. The grating constant was $g=14.5$ μm and the distance $2a=0.9$ μm.

FIG. 3 shows the measured transmission curve of a band-pass filter with a thickness $t=22$ μm, with tripolar slot apertures of a leg length $l=17$ μm, a slot width $j=5$ μm, a grating constant $g=24.5$ μm and a distance $2a=3.7$ μm.

With the described method the filter thickness t may be varied in a range of 0.2 μm to 500 μm and the grating constant may be between 2 and 1000 μm. The slot lengths k, the leg lengths $l$ and the slot widths j are adapted in value to the grating constant g in a comparable range of 1 to 1000 μm. For the lateral dimensions, however, the upper limit of 1000 μm is only a guide value which may be exceeded without difficulties. Smaller sizes than the indicated lower limits may be realized with the other lithographic methods.

A band-pass filter which has a filter thickness of over 500 μm may be made of a self-supporting unstructured metal plate which is structured by means of ion, plasma, or laser processes (Excimer Laser) such that the slot apertures are produced by partial material removal.

Further advantages of the band-pass filter according to the invention are presented as follows:

By keeping the grating constants below 34 μm a band-pass filter can be made with a pass band of less than 50 μ.

With increasing filter thickness the low-frequency blocking capabilities of the filter are improved and the inclination of the low-frequency flank is increased. The band-pass filters may be self-supporting or provided with a support frame without requiring additional supports.

By way of the formula $\lambda = 2\ l \times \cos 30°$, the tripolar leg length may be determined from the given wave length or the location of the pass band may be determined from the tripolar leg length of the slot apertures.

What is claimed is:

1. A band-pass filter for electromagnetic radiation comprising a membrane having periodically arranged slot structure elements formed therein with a predetermined grating constant with each element consisting of at least three slots of equal length extending from a common point and arranged in angular symmetry with respect to said common point, said membrane with the slot structures formed therein having a thickness of 33 to 500 μm and the ratio of the membrane thickness to the grating constant, which defines the periodic arrangement of the slot structure elements, being larger than 1.

2. A band-pass filter according to claim 1, wherein said grating constant is smaller than 34 μm.

3. A band-pass filter according to claim 1, wherein said slot structure elements are tripolar elements, each having three legs of a length $l$ providing for a transmission curve of the band-pass filter having a low-frequency maximum location at a wave length λ determined by the formula $\lambda = 2\ l \times \cos 30°$.

* * * * *